UNITED STATES PATENT OFFICE.

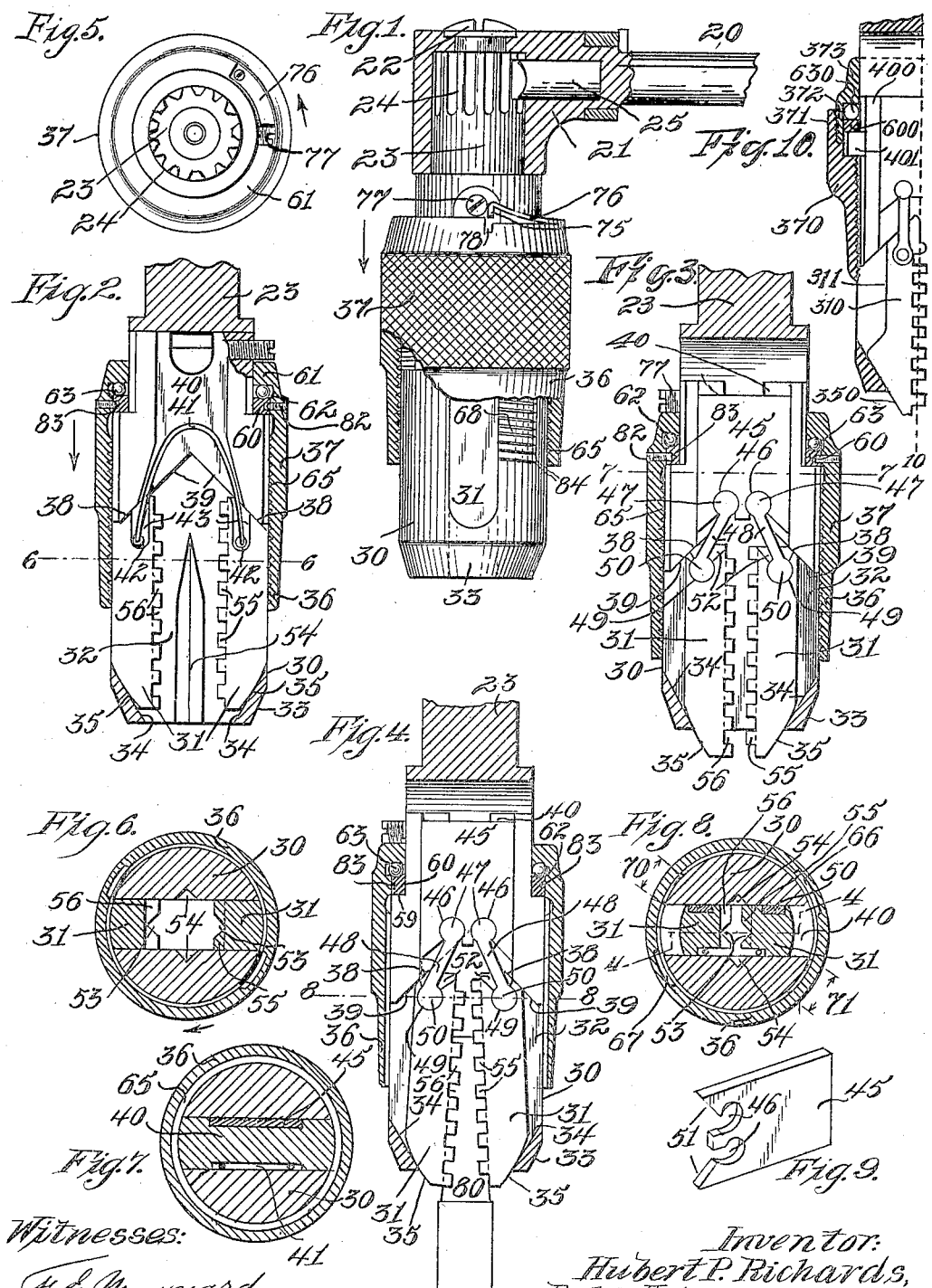

HUBERT P. RICHARDS, OF HARTFORD, CONNECTICUT.

CHUCK.

No. 817,936.         Specification of Letters Patent.         Patented April 17, 1906.

Application filed January 30, 1905. Serial No. 243,211.

*To all whom it may concern:*

Be it known that I, HUBERT P. RICHARDS, a citizen of the United States, residing in New Britain, in the county of Hartford and State of Connecticut, have invented certain new and useful Improvements in Chucks, of which the following is a specification.

This invention relates to and has for an object to provide an improved chuck for bit-stocks and other implements.

This improvement relates to that class of bit-stocks in which the shank of the bit or drill is held between a pair of jaws which are adapted to be closed by means of inclines, combined with means for actuating the jaws relative to the inclines, so as to close the jaws firmly onto the bit or like implement held between them.

In the drawings accompanying and forming a part of this specification, Figure 1 shows the lower portion of a bit-stock embodying my present improvements, certain portions being shown in central section. Fig. 2 is a central sectional view of the chuck portion, showing the jaws in their open position. Fig. 3 is a similar view, but showing the opposite side and showing the jaws in their partly-closed position. Fig. 4 is a view similar to Fig. 3, but showing the jaws closed upon the tapered end of a tool, the section in which Fig. 4 is taken being substantially in the line 4 4 of Fig. 8; but the jaws are shown in elevation instead of section, as would be indicated by such line. Fig. 5 is a top view of a portion of the device shown in Fig. 1, the bit-stock not being in this view. Fig. 6 is a cross-section on the line 6 6 of Fig. 2. Fig. 7 is a cross-section on the line 7 7 of Fig. 3. Fig. 8 is a cross-section on the line 8 8 of Fig. 4. Fig. 9 shows in perspective one of the plates of the device removed; and Fig. 10 is a view similar to Fig. 3, showing one jaw only of a different construction.

In accordance with the present improvement inclines for actuating the jaws are formed in the body of the chuck of the bit-stock or analogous tool to which the present improvement may be applied. In this connection it will be noted that the present improvement relates chiefly to the chuck proper rather than to the "bit-stock," considered as a means for using the chuck. For instance, the present improvement might be applied to drill-chucks for use on a lathe-spindle. Therefore the invention might properly be designated as an improvement in chucks for bit-stocks and other implements.

In the present embodiment of the invention there is illustrated a portion of a bit-stock 20 broken away and having a head portion 21, to which is secured a chuck by some suitable means—as, for instance, a screw 22. The stem 23 of the chuck portion is shown as provided with ratchet-teeth 24, engaging a ratchet 25, which may be controlled in some suitable manner for converting the device into a ratchet-brace or a rigid brace, as occasion may demand. This, of course, being old and well known, it does not form a part of the present invention and does not need to be particularly described or to be illustrated herein to exhibit the adaptability of the tool for general service.

The body or body portion 30 of the chuck is illustrated substantially cylindrical, and assuming that the device is made with two jaws 31 each will be received by a recess 32 in such body portion, the recess projecting through the outer wall of the body to permit the fullest extent of movement of the jaws and acting as ways for the jaws. The body is shown as tapering at 33 upon the outside and upon the inside presenting inclined faces or abutments 34, adapted to work upon the faces 35 of the lower ends of the jaws to press the jaws together when the same are advanced downwardly through the body. A sleeve 36 is shown surrounding the body portion and may be provided with a milled head 37 to afford a hold for the operator. The upper ends of the jaws are provided with inclined faces 38 and are engaged by inclined faces 39 on the block 40, which is adapted to reciprocate in the openings or ways 32 in the body portion. The faces 35 and 38 may be curved to permit greater freedom in action.

It will be seen that upon pressing the block 40 down its faces 39 will engage the faces 38 on the jaws, bringing the back ends of such jaws toward each other and at the same time forcing the ends of the jaws out of the block, causing the faces 35 to ride upon the faces 34, thus bringing the front ends of the jaws toward each other. A bow-spring 41 may have its ends entering sockets 42 in the jaws. The spring may rest in recesses 43 in the jaws where it passes from the sockets over the ends thereof to prevent the same from protruding into the guideway-space for such jaws. This spring will withdraw the jaws to their idle or open position (illustrated in Fig.

2) and will make the same responsive to the variously-shaped tools which may be inserted into the chuck. The spring is more clearly seen in Fig. 2, and in Fig. 3, which is an illustration of the opposite side of the tool, a plate 45 is shown, (also illustrated in perspective view in Fig. 9,) which plate has a pair of sockets 46, each adapted to receive a head 47 of a link 48. The jaws are each also provided with a socket 49 to receive a head 50 from such link 48. The walls of the sockets in the slide and jaws are cylindrical in form in the construction herein illustrated and which are shown as comprising in cross-section more than a half-circle, so that the links, the heads of which are also cylindrical in form, may be readily assembled in their proper positions and may be readily disassembled when occasion may demand; but when the heads are in the sockets they will be securely held from displacement by the working thrust. The plate 45 is cut away, as at 51, to permit the full extent of movement of such link, and the jaws are also cut away, as at 52, for similar purposes. Each of the jaws is provided with a centrally-disposed depression 53 in its face to assist it in receiving tools of various conformation, and the sides of the faces of the recesses 32 are also provided with depressions 54 for similar reasons.

The jaws are shown formed on their inner edges for interlocking and are adapted to seize a squared shank and which may be tapered in either direction longitudinally thereof. This general adaptability for seizing tool-shanks of different shapes and tapers is obtained by means of the "floating" jaws. The edges of the jaws may be provided with teeth or projections 55, adapted to enter seats or sockets 56 upon the opposite member, these teeth giving a more secure and substantial bite upon the tool and breaking the edge line.

When the jaws are being moved toward each other, as in being clamped upon a bit-shank, the front and back ends of each jaw will be engaged by a face for pressing the jaw toward a center line common to both jaws. The toggle connection constrains the jaws to advance in unison when they are engaged at the front and rear by the said faces. If one jaw assumes a position at an angle to the line of the common center, the other jaw will assume a position at the same angle from said center line when at work. When the parts are idle, their angularity of position is immaterial, as is also their uniformity of position, but when a bit is placed between such jaws it will press them against their actuator-faces at both ends, and the toggle connection will then come into play and immediately establish uniformity of position of the jaws.

The block 40 has a shoulder 59, on which rests a ring 60, and the sleeve portion 36 has an overhanging part 61, which has a groove corresponding with a groove in the ring 60, between which a ball-race 62 is located for antifriction ball-bearing members 63.

A leading feature of the present improvement is the mechanism whereby the jaws are operated by so-called "quick action." For this purpose the inner face of the sleeve 36 is provided with a screw-thread 65, which screw-thread is interrupted by being notched or channeled out longitudinally of the sleeve 36 at two opposite sides, (see 66 and 67, Fig. 8,) and the body portion 30 is provided with two longitudinal strips of elevated thread 68, which strips are of different widths, (see 70 and 71 in Fig. 8.) The ends of the threads where interrupted are beveled to a V-point, as seen at 84 in Fig. 1, so they will readily come into engagement with the thread on the sleeve. The strip of threads upon one side of the body portion is of a width equal to the channel 66, and the strip of threads upon the other portion is equal to the width of the channel 67. For instance, 71 and 66 are of substantially equal width, and 70 and 69 are of substantially equal width, whereby when the portion 71 is in the channel 66 the sleeve may be readily slid or shifted in a longitudinal direction; but when the threads 71 are opposite the interruption or channel 67 such longitudinal movement of the sleeve and block relatively to each other cannot be had.

In using my improved chuck, the tool being inserted between the jaws, the sleeve 36 is slid directly forward until the jaws strike the tool when the ring is rotated in the direction of the arrow, Fig. 5, (when the tool is made in this way I designate it as "left-handed," it being understood that the construction may be reversed, so that the tool will operate as a right-handed chuck,) and this movement of the actuator-ring is continued until the inclines of the thread-sections 68 force the sleeve home, and thereby force the block 40 forward until the jaws are set firmly onto the implement which is being held between the jaws. A reverse rotary movement of the sleeve at once releases the jaws, and the stops locate the parts in proper position. The sleeve may then be slid directly back in a quick action, instantly releasing the tool, which may then be removed without further operating of the chuck mechanism. When it is desired to open or close the instrument—for instance, if a tool is placed in the jaws when they are in the position illustrated in Fig. 2—the sleeve will be shifted in the direction of the arrow in Figs. 1 and 2 until the jaws have been caused to grasp the tang of the tool, when the sleeve will be turned, and thereby draw and clamp the jaws in a locked position. In many instances a slight rotary movement will be sufficient to produce the clamping; but in other instances, owing to the different conditions and shape of tool, the sleeve will be required to be given nearly a full rotation. Were the interruptions in the screw-thread 65 of a width to permit the screw-thread portions upon the body to traverse them, but half a revolution could be given, and since it is desirable to have the screw-threads upon opposite sides, so that the force of reaction will be properly distributed, the strips of screw-threads are made of dissimilar width to permit a complete rotation of the sleeve.

As a means for locating the actuator ring or sleeve 36 circumferentially of the chuck-body one of the projecting arms or ends of the jaw-actuator block 40 is shown provided with a stop 77, preferably movable, and the actuator-ring is provided with a detent or stop-face 75, in the present instance carried by a spring-finger 76, so located that when said ring is turned backwardly said stop-face 75 will come into contact with said jaw-carrier stop—as indicated, for instance, in Fig. 1—and thus circumferentially locate the actuator-ring in proper position on the chuck-body for permitting the ring to be slid backward or forward on the chuck-body, as the workman may require. The stop 77 also prevents longitudinal movement of the sleeve away from the shoulder 59. The finger will of course be depressed when it is desired to rotate the sleeve for unclamping the tool, and a notch or recess 78 may be provided for it to enter, at which time the sleeve will be unscrewed until the proper row of threads enters the channel or interruption in the threads 65, when the sleeve may then be slid in a longitudinal direction, the spring 41 serving to draw back the jaws upon their faces 34 and the spring 41 serving to open such jaws and bring them to their idle position. One feature of my present improvements relates to the making of said stop-faces one of them relative to the other, adapted for a retracting movement, so that when the carrier-ring is rotated backwardly it will come to one fixed position relative to the chuck-body, notwithstanding a pair of jaws or a plurality of a greater number may be used. Said finger and stop-faces will allow the ring to be turned around and round on the chuck-body without obstruction. On a backward rotary motion of said actuator-ring, however, the stop-face of the ring will come in contact with the aforesaid fixed stop on the jaw-carrier, and thus locate the actuator-ring in proper position for longitudinal movement on the chuck-body.

When a tool having a tapered tang, as 80, is to be clamped in the chuck, the operation is the same as that above described, the jaws readily assuming the proper relative angle, the curvature of the inclined faces on the jaws enabling such action.

In Fig. 10 a light form of construction is illustrated. The sleeve 370 has an interiorly-screw-threaded flange 371 engaging a screw-thread on a flange 372 of a ring 373 free in assembling to slip over the shell of the chuck. A pair of shoulders 401 are fast on the slide 400, and upon which shoulders a ring 600 rests, forming one member of a ball-race, the other member being in the ring 373. In assembling the parts the rings 600 and 373 will be passed over the shell or body portion of the chuck, the ring 600 resting on the shoulders 401. The balls 630 may then be placed in the race, the flange 372 preventing their escape. Then the sleeve 370 will be assembled from the lower end and the flanges 371 and 372 screwed together, and the various parts will operate as in the previously-described forms of construction. In this present form, however, the detent 77 in so far as it prevents the independent longitudinal movement of the sleeve relative to the slide may be dispensed with. The line 10 represents the center line of the chuck. To permit a comparatively wide range of movement of the jaws within a narrow body or shell 300, the jaws may be cut away, as at 311, thus making them capable of clearing the sleeve and also giving a wide bearing-face 350.

Having thus described my invention, I claim—

1. In a chuck the combination with a pair of jaws, an inclined fixed abutment for each jaw, an inclined movable abutment for each jaw, a sleeve for moving said movable abutment and having a screw-thread interrupted at two points the interruptions being of different widths, screw-threaded strips fast with the fixed abutments said strips corresponding in width with the interruptions in the sleeve screw-thread, a slide free to reciprocate relative to said abutments, and links connecting the jaws to said slide.

2. In a bit-stock, the combination with a pair of jaws, of a fixed sloping abutment and a movable sloping abutment for engaging the respective ends of said jaws and pressing them toward each other and upon a bit-shank, and a toggle connection between said jaws for causing the same, when at work, to assume like positions of angularity relative to a common center line.

3. In a chuck, the combination with a pair of jaws, of a fixed sloping abutment and a movable sloping abutment for engaging the respective ends of said jaws and pressing them toward each other, a slide free to reciprocate relative to said abutments, and links connecting the jaws to said slide.

4. In a chuck, the combination with a pair of jaws, of a fixed sloping abutment and a movable sloping abutment for engaging the respective ends of said jaws and pressing them toward each other, a slide free to reciprocate relative to said abutments, links connecting the jaws to said slide, and spring means for separating said jaws.

5. In a chuck, the combination with a pair of jaws, of means for closing the jaws, a reciprocable slide, a link for connecting each of the said jaws to said slide, said links having cylindrical heads at each end, and said slide and jaws having cylindrical sockets for receiving the said heads.

6. In a chuck, the combination with a body portion, of a pair of jaws therein, a reciprocatory member for actuating said jaws and having a slideway parallel with its path of reciprocation, a slide mounted therein, a link for connecting each of the said jaws to said slide, each of said links having cylindrical heads, and said slide and jaws having cylindrical sockets for receiving said heads.

7. In a chuck, the combination with a body portion, of a pair of jaws carried thereby, a member reciprocatory upon the said body portion for closing said jaws, and having a slideway parallel with its path of reciprocation, a slide mounted therein, a link for connecting each of the said jaws to said slide, said links having cylindrical heads, and said slide and jaws having cylindrical sockets for receiving said heads, said reciprocatory member also having a recess, and a spring located in said recess and engaging said jaws for separating the same.

H. P. RICHARDS.

Witnesses:
W. J. WORAM,
E. G. HOFFMAN.

Correction in Letters Patent No. 817,936.

It is hereby certified that the residence of the patentee in Letters Patent No. 817,936, granted April 17, 1906, upon the application of Hubert P. Richards, for an improvement in "Chucks," was erroneously written and printed "Hartford, Connecticut," whereas said residence should have been written and printed *New Britain, Connecticut*; and that the said Letters Patent should be read with this correction therein that the same may conform to the record of the case in the Patent Office.

Signed and sealed this 26th day of June, A. D., 1906.

[SEAL.]

E. B. MOORE,
*Acting Commissioner of Patents.*